June 3, 1941.  L. B. BERG  2,244,511
FILLER WIRE SUPPLY MEANS
Filed Nov. 7, 1938  11 Sheets-Sheet 8

Inventor:
Louis B. Berg
By: Edward C. Gritzbaugh
Atty.

June 3, 1941.    L. B. BERG    2,244,511
FILLER WIRE SUPPLY MEANS
Filed Nov. 7, 1938    11 Sheets-Sheet 11

Inventor:
Louis B. Berg
By: Edward C. Gritzbaugh
Atty.

Patented June 3, 1941

2,244,511

UNITED STATES PATENT OFFICE 2,244,511

FILLER WIRE SUPPLY MEANS

Louis B. Berg, Chicago, Ill., assignor to Borg-Warner Corporation, Chicago, Ill., a corporation of Illinois Application November 7, 1938, Serial No. 239,236

3 Claims. (Cl. 140—3)

This invention relates to a rolling mill for producing strands of elongated cross-section and particularly to the control for a mill especially adapted for use in combination with the weaving head of a weaving machine capable of weaving filler strips of elongated cross-section into a fabric with the major surfaces of said filler strips positioned at an angle to the plane of the fabric.

It is an object of this invention to provide a novel arrangement of control mechanism for the means that drives the rolls of the above type of mill whereby to effect the initiation of the rolling operation in the proper sequence with respect to the weaving head operation. It is a further object to provide in this type of arrangement, means independent of the initiating means for maintaining in operation the roll driving means and further, to provide for the release of this holding means in accordance with the length of material formed.

The above and other objects, advantages and uses of my invention will become more apparent from a reading from the following specification and claims taken in connection with the appended drawings which form a part of this specification and wherein:

I describe the warp wire supply assembly and the weaving head assembly in the detail necessary to bring out the novel combination including my rolling mill and control assembly, however, these structures per se are not my invention but are covered by Patent 2,223,317 of one Walkley B. Ewing, and Patent 2,214,054 of one Max P. Heinze, filed simultaneously herewith. My invention is directed primarily to a novel rolling mill structure including the control mechanism therefor and particularly to such an arrangement applied to the problem of supplying filler strands to the weaving head as described and pointed out in the appended claims.

Figure 1:
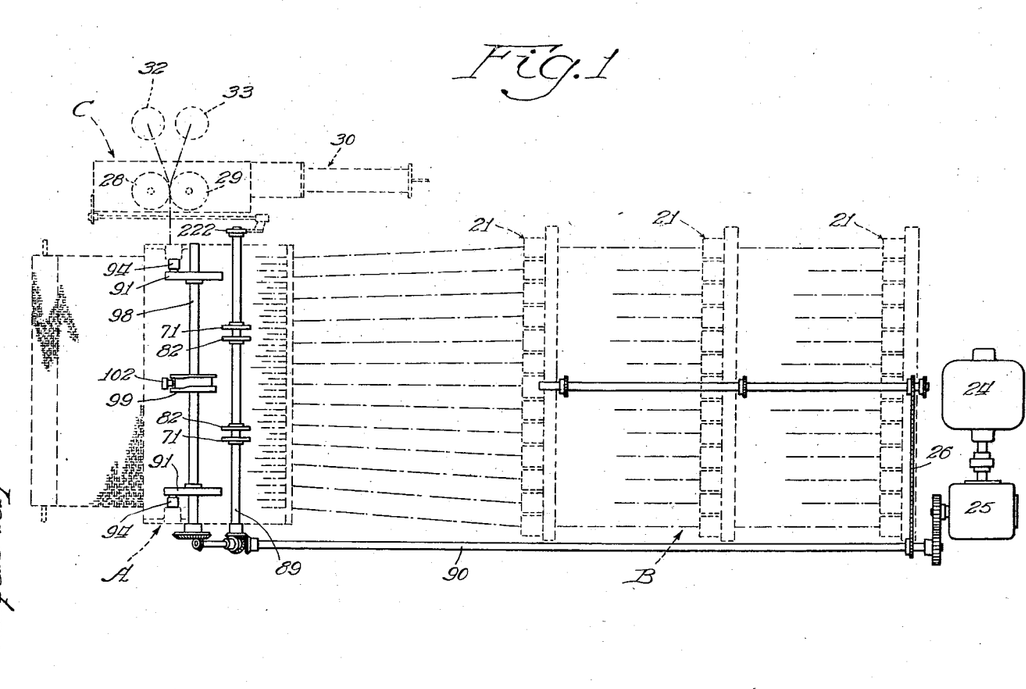
Fig. 1 is a plan view showing schematically a machine in accordance with a preferred embodiment of my invention and indicating the relationship of the weaving head, warp wire supply, and my novel rolling mill in combination, therewith.

Turning to the drawings wherein there is illustrated a weaving machine with which my rolling mill and novel control is particularly adapted for cooperation, there is shown in Fig. 1 a weaving head assembly indicated generally at A; a warp wire supply assembly indicated generally at B; and a filler wire forming an injecting assembly indicated generally at C.

The weaving head A comprises essentially a comb assembly indicated generally at 10 (see Figs. 3 to 9) formed with a plurality of guideways 11 (see Figs. 8 and 9) for guidably receiving filler strands 13 of elongated cross-section crosswise of a corresponding number of pieces of cloth being simultaneously woven and for holding the same with their major surfaces disposed at a predetermined angle to the planes of the respective pieces of cloth. The comb assembly is further specially formed adjacent the guide and holding means 11 for cooperation with two superimposed rows of rotatable quills referred to generally at 15 and 16, the function of which is to feed a plurality of uniformly spaced pairs of warp wires 17 about the filler strands 13 and to twist the respective warp wires of each pair of warp wires together to form interlocking twists 19 (see Fig. 8) for securely fastening the filler strands in position in their respective fabrics. The guide and holding means 11 is further arranged to be subsequently opened for advancing and releasing the filler strands preparatory to again being moved to a position therebehind for receiving additional filler strands 13 in said guides for likewise being tied into the cloth by again rotating the quills 15 and 16. Power means is provided in the form of motor driven cams and levers (see Figs. 4 to 7) for effecting the operation of the weaving head assembly in the proper sequence. While I have shown the weaving head as having two guides 11 together with corresponding rows of quills for weaving two pieces of cloth simultaneously, this is merely for illustration and it will be apparent that a larger number of pieces of cloth may be simultaneously woven, by merely providing additional guides 11 and corresponding rows of geared quills 16. On the other hand, only one piece of fabric may be woven, employing only one guide and one row of quills.

Warp wire supply assembly B comprises generally a plurality of rotatable tables 21 (Figs. 1 and 3) corresponding in number to the number of quills, each table supporting a pair of spools 22 and 23 for supplying pairs of warp wires 17 to each of said quills, these tables being driven the same total number of revolutions as the quills by motor 24 (Fig. 1) through reduction gearing 25 and chains 26 whereby to prevent the twisting together of the warp wires behind the quills. The warp wires pass from adjacent their respective spools through conduits for preventing entanglement and for imparting a slight tension to the warp wires.

The mill assembly C (see Figs. 10 to 14) comprises generally a pair of tangential flattening or elongating rolls 28 and 29 driven periodically in sequence with the weaving head assembly operation by a hydraulic motor 30. These rolls receive a pair of round wires from stationary spools 32 and 33 and flatten the same to form wires 13 of elongated cross-section and simultaneously inject these wires into the guide and holding means 11 of the comb assembly above described. This wire is cut off adjacent the side of the cloth in response to the forward movement of the comb assembly, during the subsequent advance of cloth, by knife 34 carried by the weaving head A and operating in conjunction with stationary shearing block 35, mounted on the mill frame.

While I prefer this arrangement for cutting off the filler wire since it has a number of distinct advantages, I nevertheless contemplate the use of other well known cutting means as coming within the broad scope of my invention, when employed in the combination disclosed, the disclosures in the patent to Riley No. 1,647,311 and the patent to Lloyd No. 1,703,276 being cited as examples of such well known arrangements.

The weaving head indicated generally at 10 comprises in further detail a backplate 50, (Fig. 8) formed with a plurality of vertical slots 51 therethrough for the passage of pairs of warp wires 17; a pair of channels 52 traversing the forward face thereof and intersecting vertical slots 51 and of the proper size for guidably receiving the ribbon-like filler strands 13; and a vertically reciprocable comb 54 formed with teeth 55 defining slots 56 therebetween corresponding in position to slots 51 in backplate 50. This comb 54 is operable on the face of plate 50 from a position wherein the teeth 55 thereof extend up between the adjacent pairs of warp wires 17 and in which position these teeth are effective to close the channels 52 in the forward face of plate 50 to define the completed guideways 11 above referred to for guidably receiving filler wires 13 of elongated cross-section and holding the same at a predetermined angle relative to the plane of the cloth into which these filler wires are to be woven, to a lowered position wherein the teeth 55 are withdrawn from the cloth and the forward portions of channels 52 are opened to permit of the retraction of the comb assembly backward to withdraw the channels from about the filler strands 13 and to again elevate the comb teeth 55 to close the channels 52 preparatory to the subsequent injection of an additional filler strand therein.

As before stated the interlocking twists between the two warp wires 17 of each pair for locking the filler strands 13 in place are produced by two rows of quills referred to generally at 15 and 16. The backplate 50 is formed with enlarged vertically extending channels 57 converging with vertical slots 51 and serving to admit the forward noses of quills 15, 16, to a point closely adjacent channels 52.

The quills are cylindrical in shape, being journalled adjacent their forward and rearward portions in bearing plates 58, 59 and geared together for synchronous rotation by circumferentially formed gear teeth. Each quill is formed with a pair of diametrically disposed coaxial grooves or channels 60 (see Fig. 8) for guidably conveying its corresponding pair of warp wires from the rear end thereof to points of discharge on the forward nose of the quill. These channel guideways pass along the periphery of the quill through the troughs between substantially diametrically opposed pairs of teeth of the quill gear and are brought out in a slight curve 61 to the nose of the quill, the direction of curvature being generally clockwise on all of the quills. The purpose of this arrangement of guideways on the quills is to discharge the respective warp wires of each quill at points lying on diameters of the quills, all of which diameters lie in parallel vertical planes at the time of discharge.

Each of the quills is further formed with a wedge-shaped forward nose 62 to facilitate its entry into channel 57 to a depth closely adjacent the filler strands 13 but spaced slightly out of contact with the channel wall with the long edges 63 of noses 61 all parallel and extending vertically. The guideways 60 discharge the warp wires from the quills at the opposite ends of the edge 63 of the wedge-shaped nose 62, to a preceding interlocking twist 19 thus defining a shed for the reception of a filler strand 13.

Figure 8:
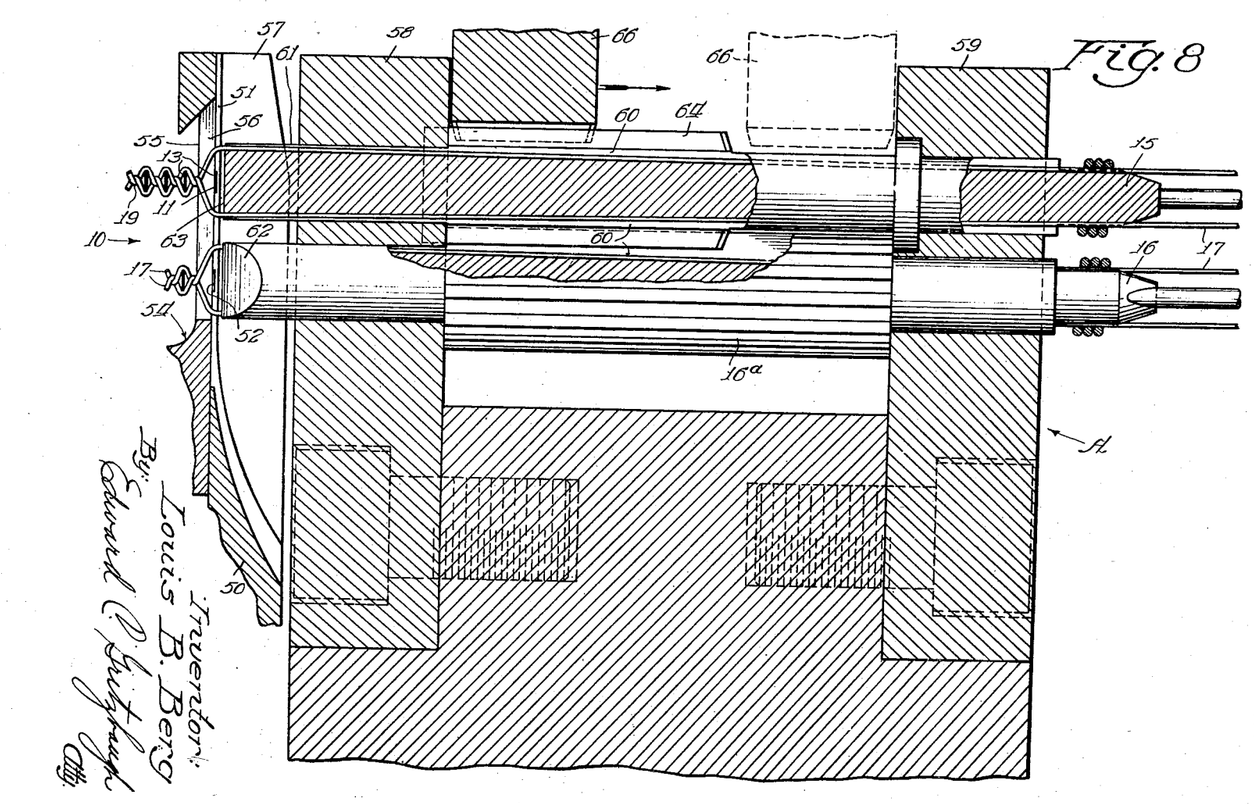
Fig. 8 is a section taken substantially on the line 8—8 of Fig. 2 and showing the arrangement of the comb assembly; the quills; and the warp wire thereon.
Figure 9:
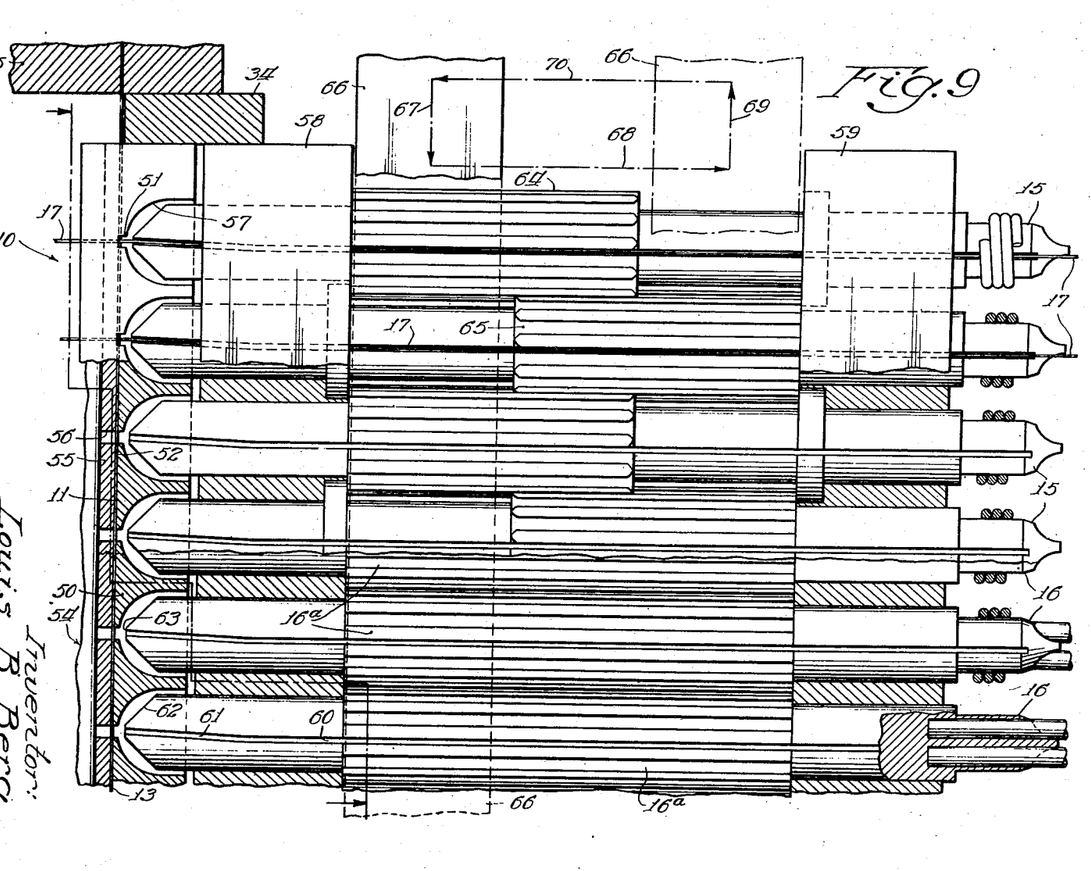
Fig. 9 is a plan view in section showing the relationship of the wedge-shaped quill noses to the backplate of the comb assembly; the relationship of the driving rack to the overlapping quill gears.

A drive arrangement is provided for effecting the rotation of all the quills synchronously at successive intervals without releasing driving contact therewith. Referring particularly to Fig. 8, the upper row of quills 15 is provided with staggered but overlapping teeth 64 and 65 on alternate quills, while the lower row of quills 16 is provided with teeth 66 extending between bearing plates 58 and 59, the gear teeth of all of the quills being in driving contact. A rack 66 is positioned for engagement first with teeth 64 of the forwardly geared quills and is arranged to be driven to the right as indicated by arrow 67 a distance sufficient to rotate the quills 360° in a clockwise direction to produce interlocking twist between the respective warp wires of each pair. Rack 66 is subsequently shifted backwards as indicated by arrow 68 in a direction parallel to the teeth thereon to a position in mesh with the teeth 65 of the rearwardly toothed quills and out of contact with teeth 64, preparatory to the subsequent movement of rack 66 to the left as indicated by arrow 69 to again effect the rotatation of the forwardly geared quills 360° in a resumed clockwise direction to again produce a row of interlocking twists for tying in a previously injected filler strand 13. The rack is subsequently shifted to the front as indicated by arrow 70 to again bring the teeth thereof into engagement with the forward quill teeth 64 to thus complete a rectangular path preparatory to repeating the cycle.

Turning next to the power operating means for moving the comb assembly 10 backward and forward relative to the quills 15 and 16 and for causing the comb 55 to be raised and lowered on the backplate 50 and also to the power means for effecting the movement of the rack 66 in the above described rectangular path, there is provided a plurality of cams driven simultaneously from a common power shaft, these cams acting upon the necessary levers through rises and falls on the cams for causing the requisite movements of the parts.

A cam 71 (Fig. 4) is effective to move the entire comb assembly 10 forward and backward about pivotal supporting shaft 72 by operating on roller 73 mounted on the end of link 74, adjustably connected to arm 75 projecting from the rear of backplate mounting member 76. Backplate mounting member 76 is connected to pivotal supporting shaft 72 through the medium of journals 77 carried on the underside thereof, supporting a transverse shaft 78 which in turn is connected by a plurality of supporting links 79 to transverse supporting shaft 72. This shaft in turn is journalled in comb assembly bearing brackets 80.

A second cam 82 (Figs. 6 and 7) located adjacent cam 71 is effective to cause the vertical reciprocation of comb mounting plate 83 by driving roller 84 mounted on the end of link 85, adjustably connected to arm 86, pivoted intermediate its ends on pin 87, journalled in the above referred to arm 75 and this arm 86 acting through roller 88 on the forward end thereof to raise and lower the comb. Comb mounting plate 83 is slidably received on the forward face of backplate mounting member 76 and is provided with a bearing plate 89 (Fig. 2) for cooperation with roller 88, and mounts comb 54 in the upper portion thereof. This comb is made of a high grade of steel and the teeth 55 are machined therein to a very fine degree of accuracy.

Actuating cams 71 and 82 are mounted on the same shaft 89 driven from a common power shaft 90 (Fig. 1) through reduction gearing 25 by electric motor 24 positioned at the rear of the machine. While I have indicated only one cam 71 and one cam 82, I contemplate the use of two each of these cams being identical in form and located adjacent the respective ends of the shaft 89 for the purpose of effecting a better balance in the operation.

The rollers carried on the ends of links 74 and 85 are held in contact with the corresponding cam by suitable means such as adjustable tension springs 75a and 88a.

The means for effecting the shifting of the rack 66 from the forward gear teeth 64 to the rear quill gear teeth 65 and back again comprises an upper cam 91 (Fig. 4) having an appropriately formed groove 92 therein engaging roller 93 for oscillating forward and backward rack shifting lever 94 mounted on fixed pivot 95 and carrying roller 96 on the opposite end thereof in driving engagement with rack carrier 97. I contemplate the use of two of these cams 91 one adjacent each end of the supporting shaft 98 for the purpose of balancing the operation of the machine.

For effecting the movement of rack 66 to rotate the quill gears there is provided a second or intermediate cam 99 (Figs. 2 and 5) having an appropriately formed cam groove 100 in the face thereof for driving cooperation with the roller 101 mounted in one end of a rack driving lever 102 pivoted intermediate its ends on pin 103 and engaging the rack carrier 97 through a roller 104 carried on the other end thereof for driving the rack back and forth to effect rotation of the quills. Cam 99 is also mounted on shaft 98, the latter being journalled in brackets 105 extending from face casting 106 and base casting 107. Shaft 98 is likewise driven from power shaft 90 but is connected through a reduction gearing whereby cams 91 and 99 are driven at one-half the speed of cams 71 and 82. The reason for this, together with an understanding of the particular sequence of operation of the above described elements of my improved weaving machine will be clearly brought out in the description of operation.

It appears to be sufficient for the purpose of this case to merely state that flat strips 13 are first injected in the guides 11 of the comb assembly 10 by my novel rolling mill arrangement. The cams 71 next become effective to move the entire comb assembly slightly forward in order to give the noses 63 of the quill sufficient clearance in order that they may be rotated within grooves 57. This movement takes place entirely about pivots 72, the complete comb assembly being shifted forward.

Cam 99 next becomes effective to drive the rack 66 for rotating the quills 360° to produce the integrating twists in the warp wires for locking the filler wire in place. Following this twisting operation, cam 71 again becomes effective to produce a further forward movement of the cam assembly for advancing the cloth a short distance while comb elevating and lowering cams 82 operate to lower comb teeth 55 from between the warp wires and to uncover the channels 52. Cams 71 next become effective to retract the entire comb assembly backward, thus removing the channels from about the filler wires 13 while cams 82 become effective to again raise the comb teeth 55 to a position between the warp wires where these teeth again cover the forward portion of channels 52 to define guideways 11 for the reception of an additional filler wire.

*Filler ribbon supply assembly and control mechanism therefor*

The spools 32 and 33 of round wire remain stationary, the round wire being drawn from the sides of the spools over guides 201, 202, thence to a guide 203 on the mill table 204, from which it is delivered to the flattening faces of rolls 28 and 29.

Figure 10:
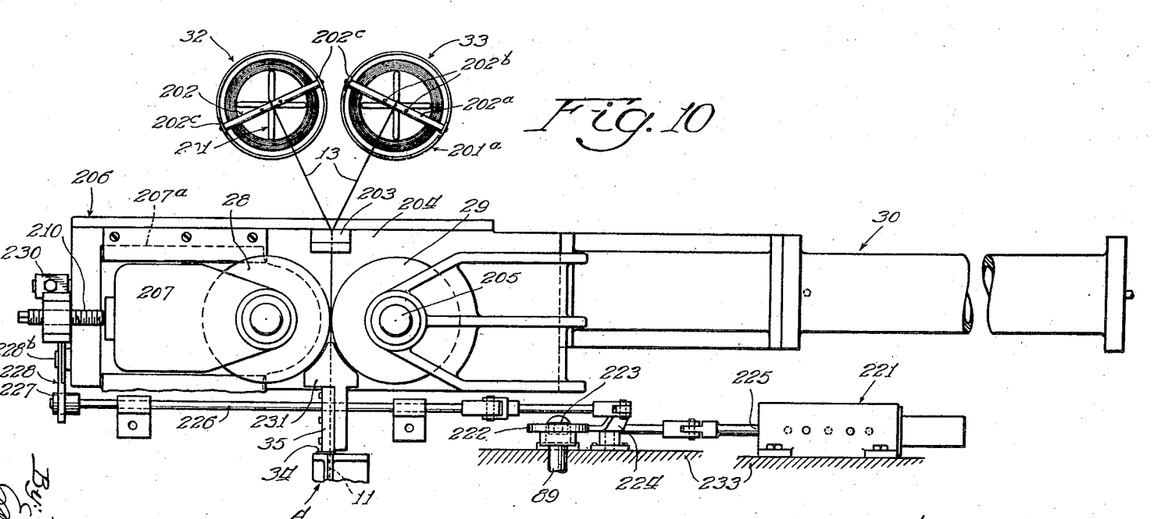
Fig. 10 is a plan view of the mill showing the stationary spools of round wire for supplying the flattening rolls and also showing a portion of the cooperating end of the comb assembly including the guide channels therein together with the cutoff knife for cutting off the flat wire adjacent to the side of the comb assembly.
Figure 11:
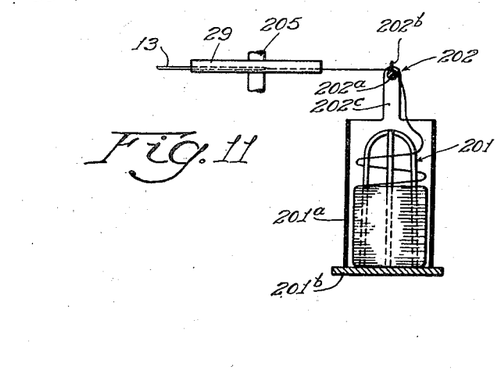
Fig. 11 is a schematic elevation partly in section showing the stationary spool of round wire with the wire being fed from the side thereof to the flattening rolls.

The spools 32 and 33 may be received in a cylinder 201 supported on a base 201b and provided at its open outer end with a bracket 201c supporting guide 202. This guide preferably is formed by a bar 202a having a pair of radially extending pins 202b effective to confine the wire therebetween (Figs. 10 and 11).

The formation from round wire of filler wire of elongated cross-section simultaneously with the injection of this wire into the shed of the fabric being woven, is important in that among other things, it avoids the inconvenience and unsatisfactory procedure of handling and injecting preformed filler ribbon. This, however, is not my invention.

The stationary supply spool arrangement for feeding the round wire to the flattening rolls is of particular advantage in the relation disclosed, since it renders unnecessary the usual arrangement of rotatable spool support and brake therefor, and otherwise simplifies this portion of the machine. The use of this stationary feed is made possible in the present combination by virtue of the fact that the round wire that is drawn off of the side of stationary spools 32 and 33, even though becoming twisted in being so drawn, the passage thereof through the flattening rolls results in a wire of elongated cross-section that is completely acceptable for the present purpose.

Figure 2:
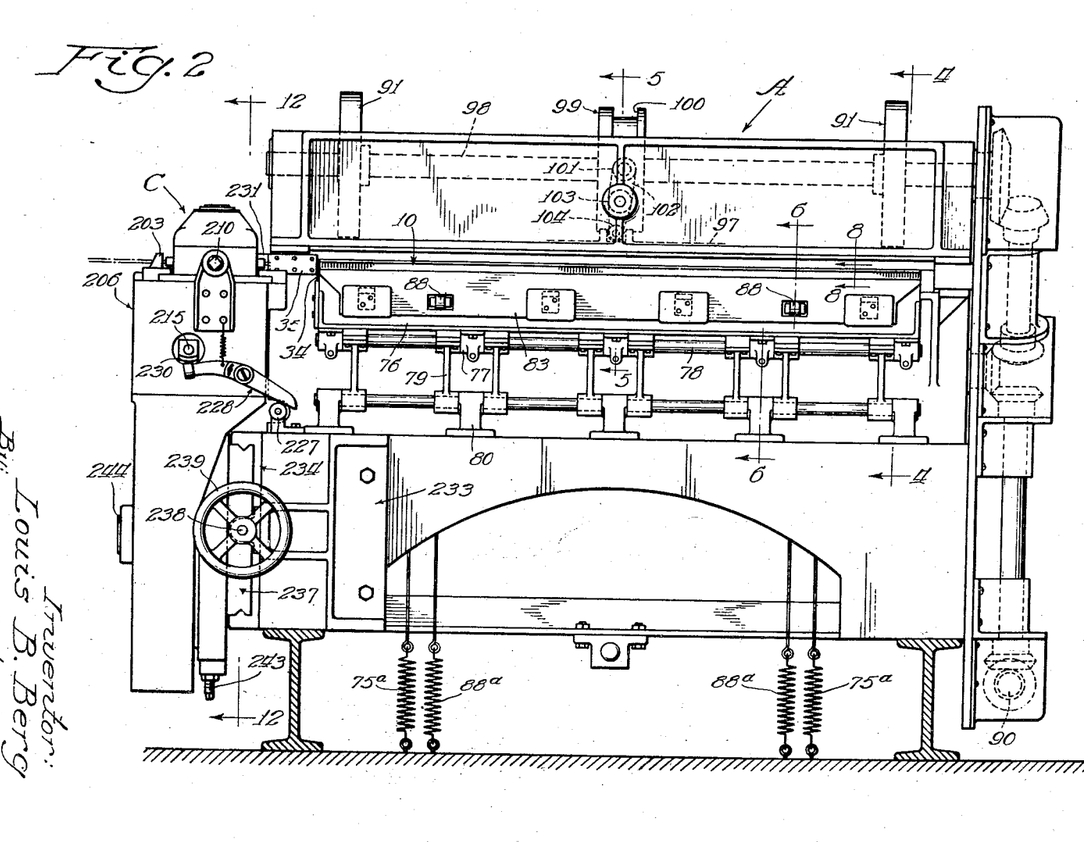
Fig. 2 is a front elevation of my rolling mill, and a weaving head with which it is arranged to cooperate.
Figure 3:
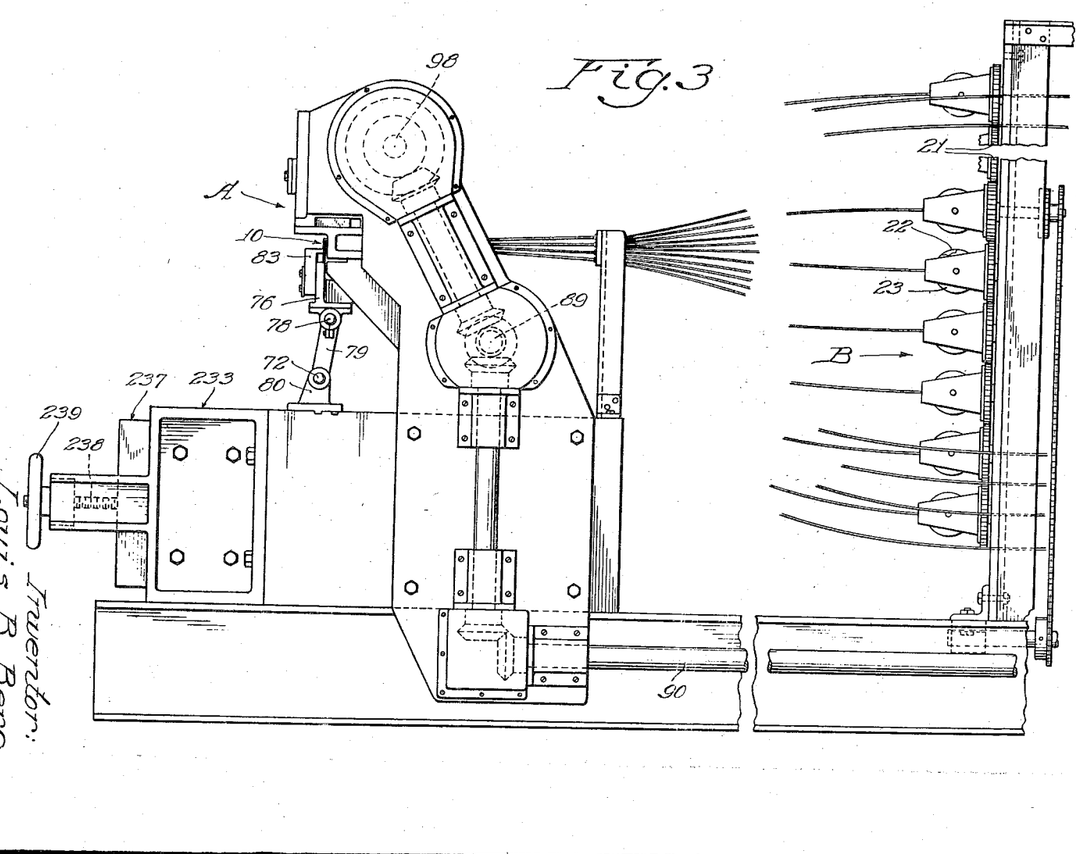
Fig. 3 is a right side elevation of the weaving head of Fig. 2 and showing in addition, the centralizing panel together with the forward one of the warp spool mounting panels.
Figure 4:
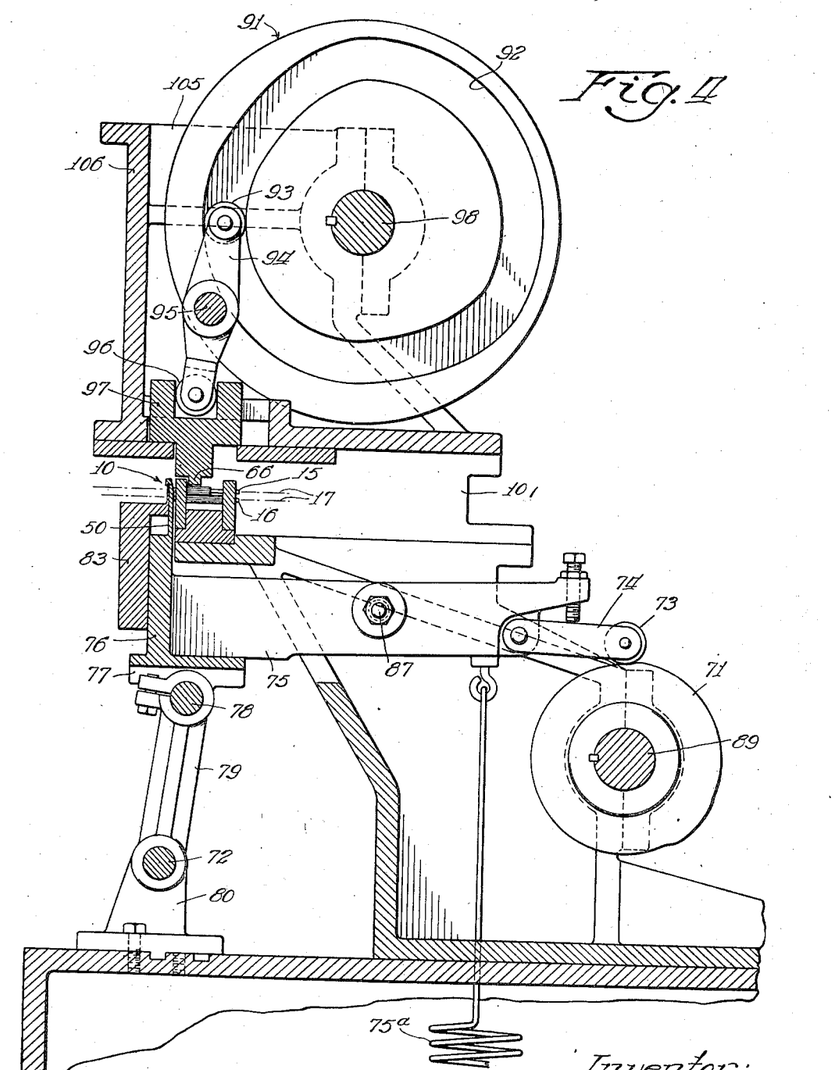
Fig. 4 is a section taken substantially on the line 4—4 of Fig. 2.
Figure 5:
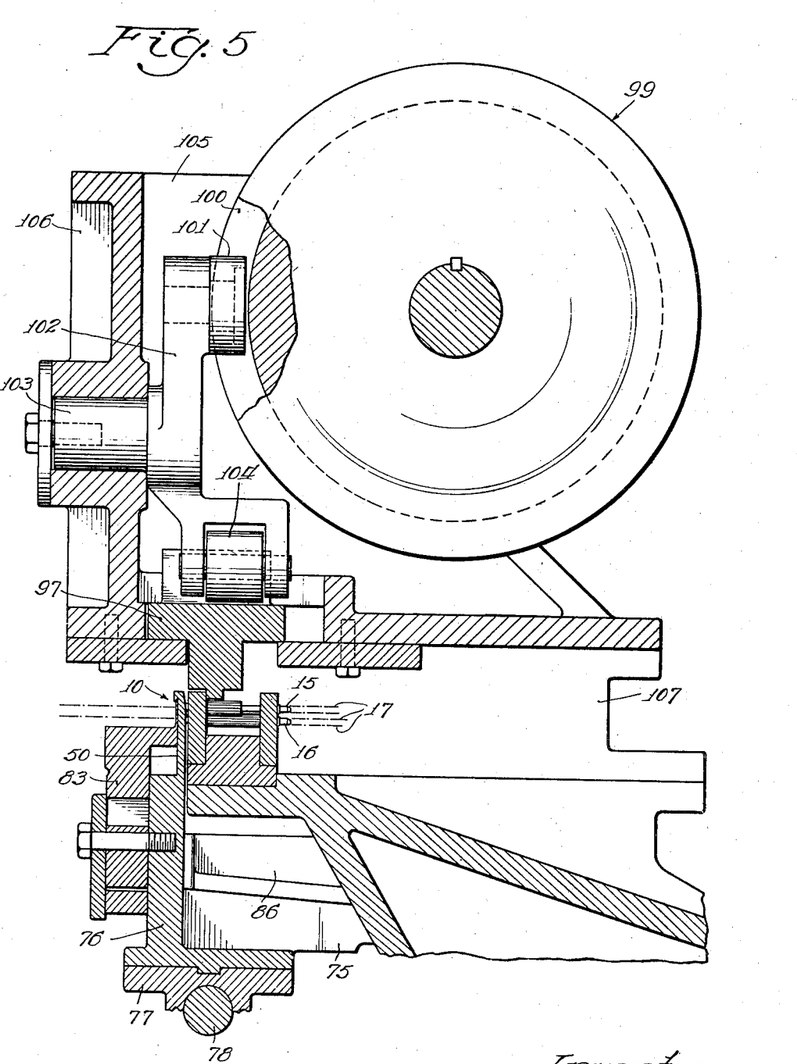
Fig. 5 is a section substantially on the line 5—5 of Fig. 2, showing the rack operating cam and associated mechanism.
Figure 6:
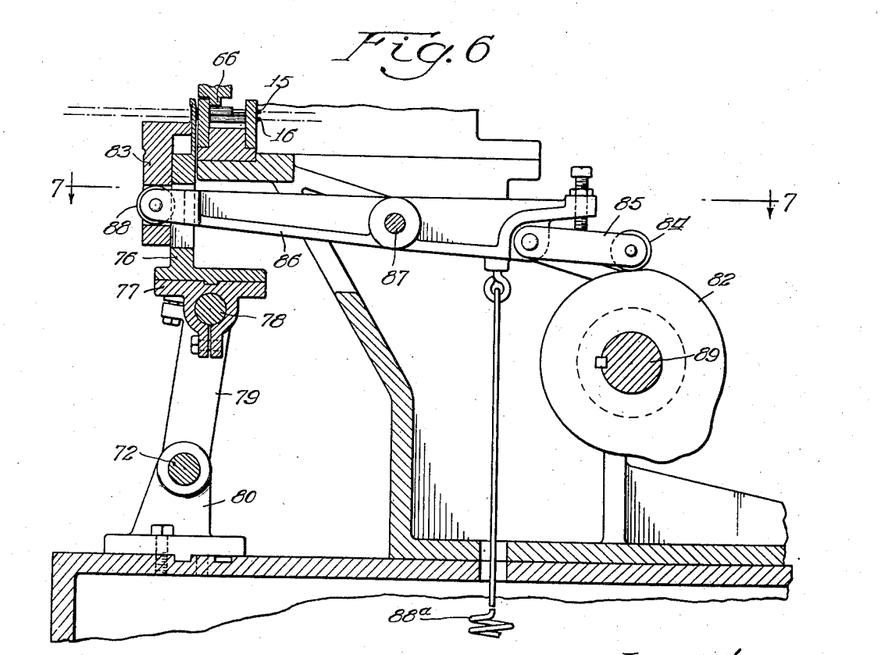
Fig. 6 is a section substantially on the line 6—6 of Figs. 2 and 7 showing the comb raising and lowering cam and lever mechanism.
Figure 7:
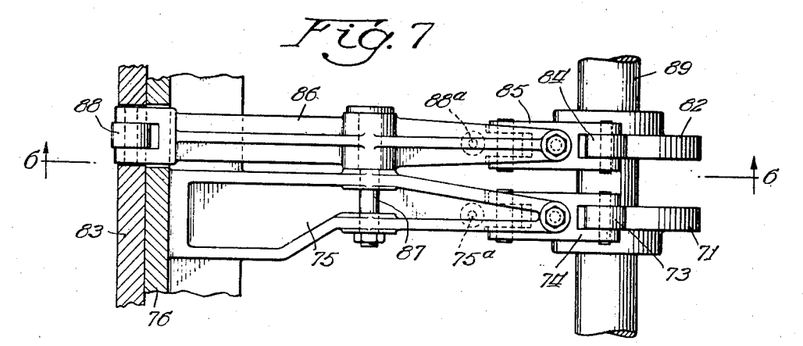
Fig. 7 is a broken away plan view taken substantially on the line 7—7 of Fig. 6, showing the relationship between the comb raising and lowering lever and cam mechanism; and comb assembly forward and backward shifting arm and cam mechanism.
Figure 12:
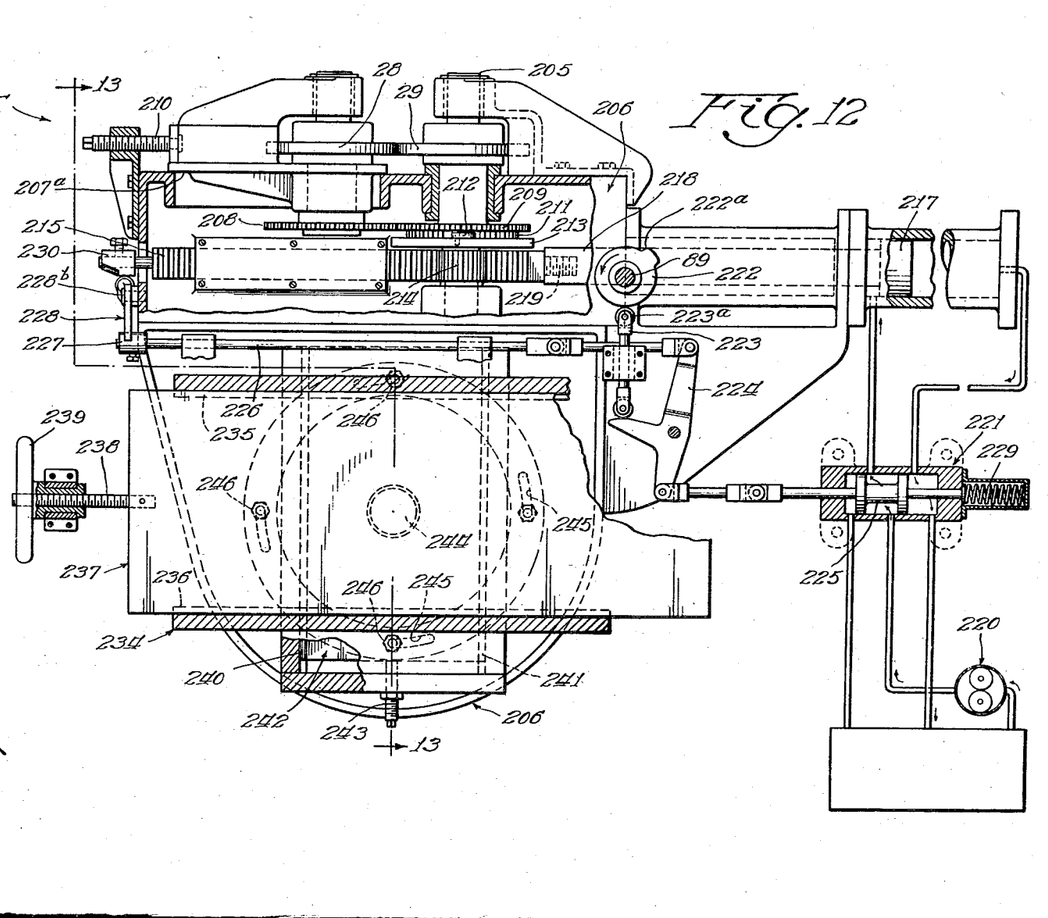
Fig. 12 is a side elevation of the rolling mill partly in section and including a showing of the fluid motor for moving a reciprocating rack for operating the rolls; the control means therefor; and the specific adjustable features of the mill.
Figure 13:
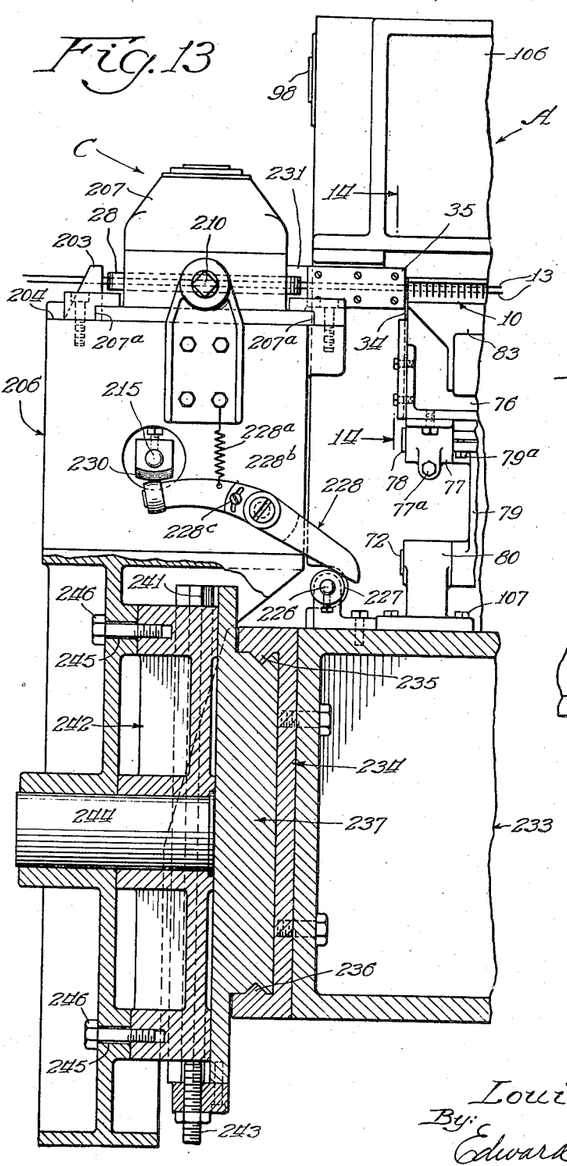
Fig. 13 is a front elevation partly in vertical section substantially on the line 13—13 of Fig. 12.
Figure 14:
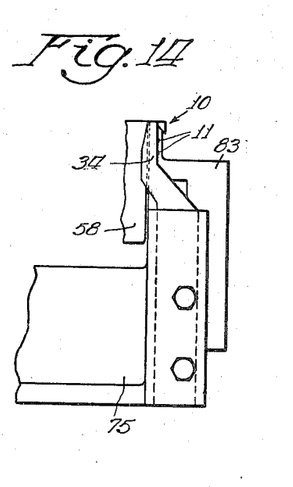
Fig. 14 is an enlarged broken away sectional view substantially on the line 14—14 of Fig. 13 showing the knife cutoff structure.

Flattening roll 29 is mounted on shaft 205 supported in suitable journals on the mill frame indicated generally at 206 (Figs. 2 and 12). Tangential flattening roll 28 is journalled in a unitary yoke 207 and is geared to tangential flattening roll 29 through gears 208 and 209. Yoke 207 is supported in guideway 209 (Fig. 10) for moving flattening roll 28 relative to flattening roll 29 in order to control the thickness of the elongated strips. The position of yoke 207 is controlled by adjusting screw 210 for varying the thickness of the flat filler wire.

The flattening rolls are driven periodically in sequence with the operation of the comb and quill assembly through a ratchet clutch including a ratchet gear 211 (Fig. 12) and ratchet 212, mounted on plate 213 connected to a gear 214 driven by a rack 215, in turn motivated by a fluid motor indicated generally at 30.

The fluid motor 30 is of a well known type comprising a reciprocable piston 217 connected by a piston rod 218 through the usual liquid seal (not shown) to the rear end of the rack 215 to which it is in turn fastened by any suitable means such as a threaded connection 219.

My invention is particularly directed to the following novel control mechanism in combination with the above structure with which it is particularly arranged for cooperation.

Fluid power for operating piston 217 is supplied by a pump 220 through a two-way valve 221 effective to control the supply of pressure to either side of the piston depending upon the position of the valve 221. This two-way valve is under the control of a cam 222 mounted on shaft 89 along with the comb assembly actuating cams 71 and 82. Cam 222 becomes effective at the beginning of the last 180 degrees of rotation of shaft 89 to depress link 223 which in turn operates bell crank 224 to shift valve 221 to the right, and thus cause the same to deliver fluid pressure from pump 220 to the rear side of piston 217. Bell crank 224 is further effective to move control rod 226 against the resistance of compression spring 229 to a point where collar 227 carried thereon permits link 228, urged by spring 228a, to drop in front thereof to thus hold control valve 225 in the position to which it was moved. Piston 217 is now subjected to fluid pressure, and drives rack 215 to the left in Fig. 12 until cam 230 carried on the forward end of rack 215 contacts an upper end of link 228, thus lifting the same out of locking relationship with respect to collar 227, and permitting spring 229 to shift plunger 225 of valve 221 to the left in Fig. 12, thus changing the delivery of fluid pressure to the opposite side of piston 217, and causing it to be stopped and returned preparatory to again driving the rolls.

The ratchet and pawl 211 and 212 operate to drive the rolls in one direction only, namely, in the feeding direction and permit of the free return of the rack to its initial driving position. Provision for adjustment in the operation of locking lever 228 is made by hinging the two ends of the lever at 228b and clamping these two end portions together in their adjusted positions by clamping screw 228c.

It will thus appear that I have provided means for driving the flattening rolls, the initiation of which is under the control of cam 222, while the continued operation of the same to produce a flat wire of a given length is under the control of flattening means 228 and cam means 230, operable in accordance with the travel of the driving rack 215. This feature is of great importance in the present combination, since it provides assured travel of the rack 215 for the desired distance necessary to produce a predetermined length of flat wire which travel is determined only by the setting of cam 230 relative to the end of the rack 215. This adjustment may be effected by any well known means, such, for example, as a clamping screw passing through the body of cam 230 and engaging the supporting portion of the rack member 215.

While I have shown a ratchet and pawl one-way drive arrangement, it is quite apparent that other forms of one-way drive may be employed, such for example, as the well known free-wheeling clutch disclosed in the patent to Leschhorn, No. 1,684,838.

Adjustment of the rolling mill assembly to provide for the proper registry of the discharge guide 231 and cutoff block 34 with the receiving guideways of the comb assembly when the machine is adjusted for weaving fabric having the flat filler wires locked therein at different angles to the plane of the fabric, is provided by the construction of the mounting for supporting the mill frame 206 from the weaving head main frame indicated generally at 233.

This arrangement includes a first horizontal guideway defining member 234 provided with a pair of opposed horizontal tongues 235 and 236 adapted to guidably confine an intermediate adapter member 237. The adapter 237 is horizontally adjusted along guides 235, by means of screw 238 under the control of handwheel 239. Adapter 237 is formed with vertically confining guide tongues 240 and 241 for receiving and confining an auxiliary adapter member 242 which is vertically adjustable along guides 240, 241 by means of adjusting screw 243. Auxiliary adapter 242 has shaft 244 journalled therein which in turn supports rolling mill frame 206. The rolling mill frame is made adjustable about shaft 244 and relative to auxiliary adapter member 242 by provision of arcuate slots 245 formed in mill frame member 206 for cooperation with clamping screws 246 passing through these slots and effective to clamp the frame member 206 to auxiliary adapter member 242.

It will thus be seen that the rolling mill frame 206 can be readily adjusted horizontally, vertically and pivotally to bring the delivery channel of the shearing block 34 into precise alignment with the receiving guideway channels 11 of the comb assembly.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a wire fabric weaving machine capable of producing fabric composed of a plurality of generally parallel evenly spaced filler wires of elongated cross-section disposed with their major surfaces at an angle to the plane of the fabric, and a plurality of pairs of warp wires embracing said filler wires and fastening the same in place, said machine comprising means for guidably receiving flat filler wires injected from the side of said machine and for holding the same at a predetermined angle to the plane of the fabric, means for feeding said warp wires about said filler wires and manipulating the same to produce a shed for the reception of laterally injected flat filler wires, means for operating said shed-forming means, the combination therewith of a flat wire rolling mill for receiving round wire rolling the same and injecting the same into said guide means, power means for operating said rolls, control means for initiating the operation of said power means, said control means being connected in driving relationship with said means for operating said shed-forming means whereby to operate the latter in sequence with the operation of said roll operating means, means for maintaining said roll operating means in operation following said initiation of its operation, means operable in accordance with the length of flat wire rolled and injected into said guide means for limiting the extent of operation of said roll operating means by releasing said maintaining means.

2. In a wire fabric weaving machine, means for guidably receiving a flat wire and for holding the same at a predetermined angle to the plane of the fabric, means for feeding a plurality of pairs of warp wires about said flat filler wire and for moving the same relative to the median plane of the fabric for defining a shed for the reception of a subsequent filler wire, and means for operating said feeding and shed-forming means, the combination therewith of a rolling mill assembly for producing said flat wire from round wire and injecting the same into said guide, and control means for correlating the operation of said mill and the operation of said weaving means in a predetermined sequence comprising power means for operating said rolls, means for initiating the operation of said power means, said initiating means being connected to said operating means for said shed-forming and feeding means, means for maintaining said power means in operation, and means operable in accordance with the length of flat wire rolled and injected for releasing said holding means to stop the rolling and feeding of said wire.

3. The structure as defined in claim 2 wherein said roll operating means comprises a rack and a fluid motor for reciprocating said rack, a two-way valve for controlling the supply of fluid pressure to said fluid motor, a rotatable cam having a rise thereon for effecting the operation of said two-way valve to cause the same to deliver fluid to said hydraulic motor for moving said rack, said cam being connected to said means for operating said shed-forming and feeding means, means for maintaining said two-way valve in the operated position when the same has been operated by said cam, additional cam means operated in accordance with the travel of said rack for effecting the movement of said two-way valve to a position for delivering fluid to said hydraulic motor for driving the same in the opposite direction, whereby to control the length of flat wire that is formed by said mill and to effect the return of said hydraulic motor to its original position preparatory to again driving said rack.

LOUIS B. BERG.